(12) United States Patent
Ingvast et al.

(10) Patent No.: US 8,118,921 B2
(45) Date of Patent: Feb. 21, 2012

(54) UNIT FOR ACCUMULATING AND DEGASSING OIL

(75) Inventors: Håkan Ingvast, Själevad (SE); Andreas Norberg, Överhörnäs (SE)

(73) Assignee: Hydac Fluisteknik AB, Spanga (SE)

( * ) Notice: Subject to any disclaimer, the term of this patent is extended or adjusted under 35 U.S.C. 154(b) by 154 days.

(21) Appl. No.: 12/450,375

(22) PCT Filed: Mar. 26, 2008

(86) PCT No.: PCT/SE2008/050336
§ 371 (c)(1),
(2), (4) Date: Jan. 29, 2010

(87) PCT Pub. No.: WO2008/118086
PCT Pub. Date: Oct. 2, 2008

(65) Prior Publication Data
US 2010/0139491 A1    Jun. 10, 2010

(30) Foreign Application Priority Data
Mar. 26, 2007   (SE) ...................................... 0700744

(51) Int. Cl.
*B01D 19/00* (2006.01)
(52) U.S. Cl. ......................................................... 96/193
(58) Field of Classification Search ................... 96/193, 96/174
See application file for complete search history.

(56) References Cited

U.S. PATENT DOCUMENTS

| 3,933,448 | A | * | 1/1976 | Di Peri ............................ 96/219 |
| 4,385,909 | A | * | 5/1983 | Starr ............................... 95/266 |
| 4,473,529 | A | * | 9/1984 | Boccon-Gibod ............. 376/314 |
| 7,125,438 | B2 |   | 10/2006 | Skoglund et al. |

FOREIGN PATENT DOCUMENTS

WO    WO 94/28316 A1    12/1994

* cited by examiner

*Primary Examiner* — Duane Smith
*Assistant Examiner* — Douglas Theisen
(74) *Attorney, Agent, or Firm* — Roylance, Abrams, Berdo & Goodman, LLP (57) ABSTRACT

A unit (1) for accumulating and degassing oil in an oil system comprising a reservoir (2) provided with a first chamber (3) in which the oil is subjected to atmospheric pressure and in which the oil volume is allowed to vary, a second chamber (4) which is intended to be at least nearly completely filled with oil and in which the oil is kept separated from direct contact with surrounding air, and a flow passage (7) between the chambers. A air-tight flexible member (11) is arranged in the first oil accumulation chamber in order to keep the oil therein separated from direct contact with surrounding air. The unit also comprises an apparatus (20) for degassing oil, which is connected to the reservoir and comprises an entrance (21a) for feeding oil into the apparatus (20), an exit (22a) for oil connected to the reservoir, and a degassing room.

8 Claims, 4 Drawing Sheets

Fig 1

PRIOR ART

UNIT FOR ACCUMULATING AND DEGASSING OIL

FIELD OF THE INVENTION AND PRIOR ART

The present invention relates to a unit according to the preamble of claim 1 for accumulating and degassing oil in an oil system.

The unit of the invention is intended to be permanently installed in an oil system, such as for instance a hydraulic oil system, a lubricating oil system or a cooling oil system, where the condition of the oil affects the function, life and operational reliability of the system.

In contact with atmospheric air at +20° C. and at 100% relative humidity, about 100 litres of air and about 0.1 litre of water will be dissolved into 1000 litres of mineral oil. This dissolvation is completely natural and cannot be prevented and will cause different kinds of problems. Air and water dissolved into the oil will cause chemical degradation of the oil and will contribute to cavitation effects and diesel effects in the oil system. If oil saturated with gas and water is subjected to under-pressure, dissolved gas and water is released to an extent depending on the magnitude of the under-pressure and the temperature of the oil.

An oil system normally comprises an oil reservoir for accumulation of oil. The oil returned to the oil reservoir normally has undesired free gas bubbles due to the fact that the oil has been subjected to under-pressure in the oil system, which has caused release of dissolved air from the oil. These gas bubbles are very harmful if they are allowed to recirculate via the suction line of the oil system, and they must therefore be removed. In a traditionally constructed oil system, the removal of gas bubbles takes place by giving the oil a long retention time in the oil reservoir so that the gas bubbles will have time to rise and escape to the atmosphere via the oil surface in the oil reservoir. Thus, the oil reservoir has a deaerating function, which implies that the volume of the oil reservoir has to be large. Despite this, the oil in the oil reservoir is almost saturated with air, which will cause a release of air in suction lines and in pumps with loss of performance, cavitation damages and diesel effects as a result. Dissolved air and humidity in the oil will also contribute to the degradation of the oil, which will result in a need to renew the oil regularly.

Figure 1:
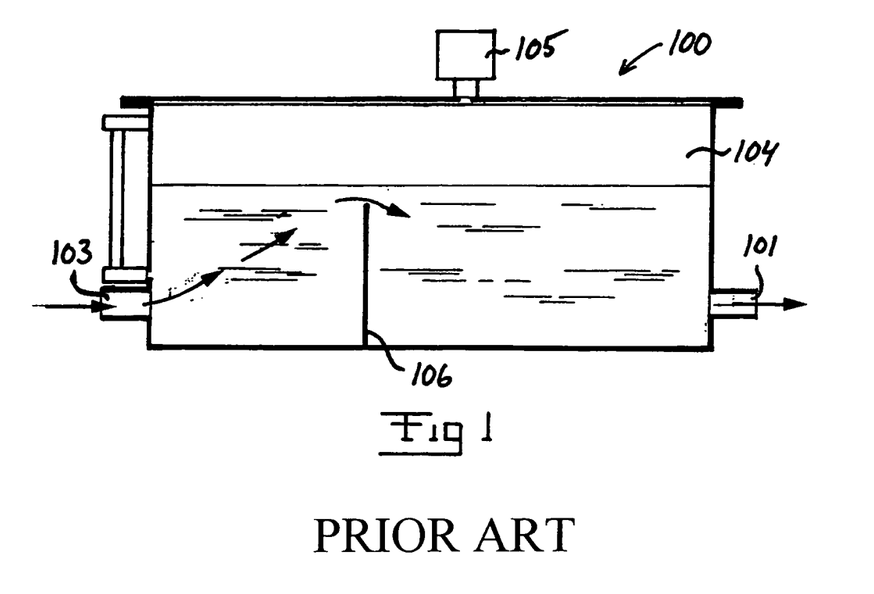
FIG. 1 is a schematic, cut lateral view of a traditional oil reservoir representing prior art.

An oil reservoir 100 of traditional design is schematically illustrated in FIG. 1. This reservoir comprises an outlet port 101, through which oil is sucked out from the reservoir by an oil pump for delivery to different components of an oil system connected to the reservoir. Oil is returned to the reservoir 100 from the oil system via an inlet port 103 of the reservoir. The inner space 104 of the reservoir 100 is connected to the surroundings via an air filter 105. Thus, the oil in the reservoir is in direct contact with the surrounding air via this air filter 105. A flow of air through the air filter 105 will occur when the volume of the oil in the reservoir changes, for instance due to variations in the temperature of the oil or variations in the oil volume in possible hydraulic cylinders or oil accumulators of the oil system. The reservoir 100 may be provided with a partition wall 106 in order to force the oil up towards the oil surface in the reservoir when flowing from the inlet port 103 to the outlet port 101 so as to thereby improve the removal of gas bubbles from the oil.

SUMMARY OF THE INVENTION

The object of the present invention is to provide a new and favourable unit for accumulating and degassing oil in an oil system.

According to the invention, this object is achieved by a unit having the features defined in claim 1.

The oil accumulating and degassing unit of the invention comprises:
- a reservoir provided with one or several inlet and outlet ports through which oil is allowed to flow into and out of the reservoir, a first oil accumulation chamber in which the oil is subjected to atmospheric pressure and in which the oil volume is allowed to vary, a second oil accumulation chamber which is intended to be completely or at least nearly completely filled with oil and in which the oil is kept separated from direct contact with surrounding air, and a flow passage between the second oil accumulation chamber and the lower part of the first oil accumulation chamber;
- an air-tight flexible member in the form of a membrane or bag arranged in the first oil accumulation chamber in order to keep the oil in the first oil accumulation chamber separated from direct contact with surrounding air, the oil in the first oil accumulation chamber being subjected to atmospheric pressure via this flexible member; and
- an apparatus for degassing oil, which apparatus is connected to the reservoir and is provided with:
  - an entrance for feeding oil into the apparatus,
  - a first exit connected to the reservoir for feeding oil out of the apparatus and into the reservoir,
  - a degassing room in which oil is subjected to under-pressure for promoting separation of gas from the oil,
  - a second exit connected to the degassing room for discharging separated gas from the apparatus,
  - an inlet connected to the entrance for feeding oil into the degassing room, and
  - an outlet connected to the first exit for feeding oil out of the degassing room.

With the unit of the invention, the reservoir will be supplied with degassed and dehumidified oil from the degassing apparatus and the reservoir will thereby contain oil undersaturated with dissolved gas and water. Owing to the fact that the deaeration of the oil is taken care of by the degassing apparatus, the oil reservoir does not need to have any deaerating function in itself, which implies that the volume of the oil reservoir can be small as compared to a traditional oil reservoir with deaerating function. Furthermore, the flexible member will prevent air and humidity from being dissolved into the oil accumulated in the first oil accumulation chamber.

According to an embodiment of the invention, the upper part of the second oil accumulation chamber is connected to the degassing room of the degassing apparatus via a non-return valve, through which gases and oil is allowed to be sucked into the degassing room from the upper part of the second oil accumulation chamber. Hereby, any free air or other gases accumulated above the surface of the oil in the upper part of the second oil accumulation chamber are sucked out from the second oil accumulation chamber and into the degassing room by the under-pressure generated in the degassing room. By sucking gases and oil from the upper part of the second oil accumulation chamber, the degassing apparatus will create an under-pressure in the upper part of the second oil accumulation chamber. This under-pressure will keep the second oil accumulation chamber filled or at least nearly filled with oil as long as a sufficient volume of oil remains in the reservoir.

According to another embodiment of the invention, a throttling is arranged between the upper part of the second oil accumulation chamber and the degassing room in series with the non-return valve, and a pressure sensor is arranged in the degassing room for measuring the pressure therein. When any free air or other gases accumulated above the surface of the oil in the upper part of the oil accumulation chamber have been sucked out from the second oil accumulation chamber via the non-return valve and the throttling, oil will be sucked out from the second oil accumulation chamber via the non-return valve and the throttling. Due to the throttling, this oil flow into the degassing room from the second oil accumulation chamber will be considerably smaller than the corresponding gas flow. The under-pressure achieved in the degassing room will thereby be considerably smaller when gas is sucked into the degassing room from the second oil accumulation chamber as compared to when oil is sucked into the degassing room from the second oil accumulation chamber. A comparatively small under-pressure in the degassing room will consequently imply that gas is sucked into the degassing room from the second oil accumulation chamber, which in its turn may indicate a functional disorder in the unit or the associated oil system.

According to another embodiment of the invention, the degassing apparatus is at least partly located inside the second oil accumulation chamber with the first exit of the apparatus located inside the second oil accumulation chamber. This will give a compact unit with a minimum of sealed external connections that may be installed in an oil system in a simple manner as a pre-assembled unit. Furthermore, the parts of the degassing apparatus located in the second oil accumulation chamber will be protected from the surroundings by the outer walls of the reservoir.

Further advantages as well as advantageous features of the unit of the present invention will appear from the following description and the dependent claims.

BRIEF DESCRIPTION OF THE DRAWINGS

With reference to the appended drawings, a specific description of preferred embodiments of the invention cited as examples follows below. In the drawings.

DETAILED DESCRIPTION OF PREFERRED EMBODIMENTS OF THE INVENTION

The unit 1 of the present invention comprises a reservoir 2 for accumulation of oil and an apparatus 20 for degassing oil connected to the reservoir 2. The unit 1 is intended to be installed in an oil system in order to take care of accumulation and degassing of oil contained in the oil system.

The reservoir 2 comprises a first oil accumulation chamber 3 in which the oil is subjected to atmospheric pressure and in which the oil volume is allowed to vary, and a second oil accumulation chamber 4 which is intended to be completely or at least nearly completely filled with oil and in which the oil is kept separated from direct contact with surrounding air. In the illustrated examples, the two oil accumulation chambers 3, 4 are separated from each other by a partition wall 5 extending across the reservoir 2.

The reservoir 2 is provided with one or several inlet and outlet ports 6, through which oil is allowed to flow into and out of the reservoir 2. In the illustrated example, two such inlet and outlet ports 6 are provided. One port 6 may be used as a specific inlet port for return of oil to the reservoir from other parts of the oil system and another port 6 used as a specific outlet port for supply of oil from the reservoir to other parts of the oil system. However, one and the same port 6 may alternatively be used as a combined inlet and outlet port for conveying oil in both directions. Oil is sucked out from the reservoir 2 via one of the ports 6 by an oil pump included the oil system for delivery of the oil to different parts of the oil system.

Figure 2:
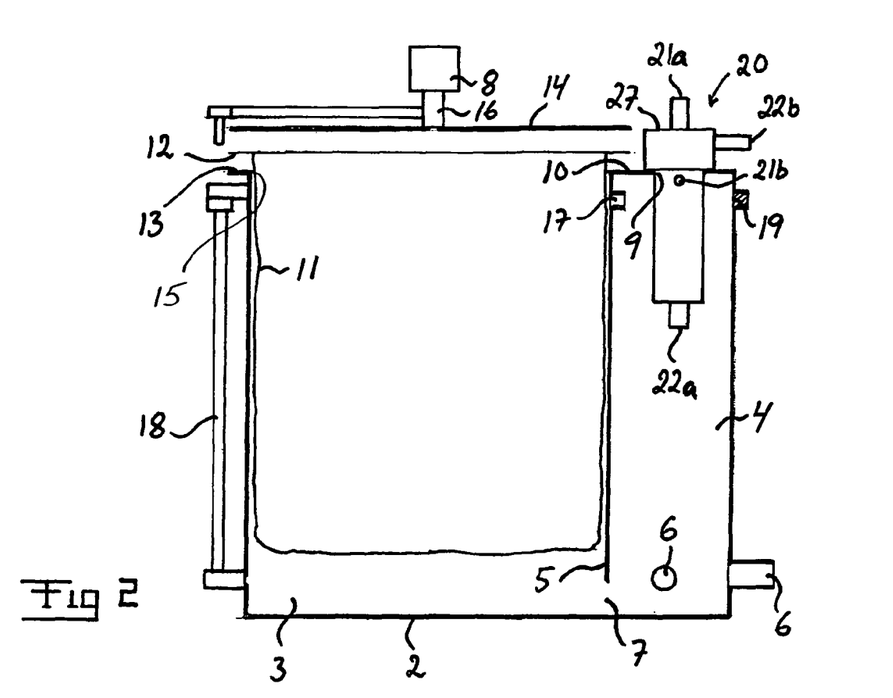
FIG. 2 is a schematic, cut lateral and exploded view of a unit according to an embodiment of the present invention.
Figure 3:
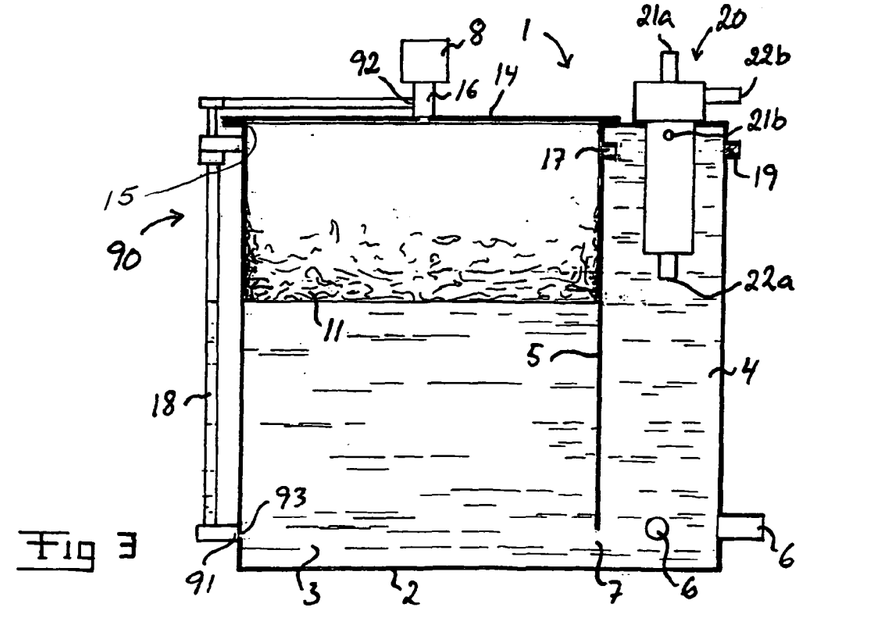
FIG. 3 is a schematic, cut lateral view of the unit of FIG. 2 as seen in its assembled state.

A flow passage 7 is provided between the second oil accumulation chamber 4 and the lower part of the first oil accumulation chamber 3. Thus, the first oil accumulation chamber 3 is connected to the second oil accumulation chamber 4 via this flow passage 7. The flow passage 7 is preferably arranged to connect the lower part of the first oil accumulation chamber 3 with the lower part of the second oil accumulation chamber 4, as illustrated in FIGS. 2 and 3. In the illustrated example, the flow passage 7 consists of an opening provided in the partition wall 5.

The degassing apparatus 20 is provided with:
a first entrance 21a for feeding oil into the apparatus 20;
a first exit 22a connected to the second oil accumulation chamber 4 for feeding oil out of the apparatus 20 and into the second oil accumulation chamber;
a degassing room 30 (see FIGS. 4a and 5) in which oil is subjected to under-pressure for promoting separation of gas from the oil;
a second exit 22b connected to the room 30 for discharging separated gas from the apparatus 20 to the surroundings;
an inlet 31 connected to the first entrance 21a for feeding oil into the room 30, and
an outlet 32 connected to the first exit 22a for feeding oil out of the room 30.

In the illustrated examples, the degassing apparatus 20 also comprises a non-return valve 33 which is connected to the upper part of the room 30 and which is arranged to allow gases and water vapour to flow out of the room 30 so as to thereby allow an under-pressure that promotes separation of gas from the oil to be generated in the room 30. The room 30 is connected to the second exit 22b via this non-return valve 33. In the example illustrated in FIGS. 4a-4c, the non-return valve 33 is connected to an outlet 37 for gases and water vapour arranged in the uppermost point of the room 30. In a first operating phase, oil is sucked out from the room 30 via the outlet 32, which results in a sinking of the oil level in the room 30. As the oil level sinks in the room 30, the absolute pressure in the room 30 drops so that gases and water vapour are released from the oil in the room 30 as bubbles and accumulated at the oil free upper part of the room. In a second operating phase, oil is supplied into the room 30 via the inlet 31, which results in a rising of the oil level in the room. As the oil level rises in the room 30, the absolute pressure in the room increase so that gases and water vapour accumulated at the upper part of the room 30 during the pervious operating phase are forced out of the room 30 via the non-return valve 33. The feeding of oil into the room 30 via the inlet 31 is regulated by means of a regulating device 50 and the sucking out of oil from the room 30 via the outlet 32 is accomplished by means of a suction arrangement 40. Possible implementations of such a regulating device and suction arrangement will be more closely described below.

The first entrance 21a of the degassing apparatus 20 is to be connected to a supply conduit for supply of pressurized oil into the apparatus. This supply conduit may for instance form part of an oil circulation circuit provided with an oil pump, which continuously or repeatedly sucks oil from the reservoir 2 via one of its ports 6 and feeds the oil back into the reservoir via the degassing apparatus 20. The degassing apparatus 20 is with advantage hydraulically driven by the pressurized oil fed into the apparatus via the first entrance 21a.

The degassing apparatus 20 is also provided with a second entrance 21b connected to the upper part of the second oil accumulation chamber 4 for sucking out any possible free air or other gases accumulated in the upper part of the second oil accumulation chamber 4 above the oil. This second entrance 21b is connected to the room 30 via a non-return valve 24 (see FIGS. 4a and 5), through which gases and oil is allowed to be sucked into the room 30 from the upper part of the second oil accumulation chamber 4. Fluid flow in the opposite direction, i.e. from the room 30 to the entrance 21b, is prevented by the non-return valve 24.

A throttling 25 is arranged between the second entrance 21b and the room 30 in series with the non-return valve 24 in order to restrict the flow of oil into the room 30 from the upper part of the second oil accumulation chamber 4.

A pressure sensor 26 may be arranged in the room 30 for measuring the pressure therein. The measuring signal from the pressure sensor 26 may be used for monitoring the functioning of the degassing apparatus 20.

The degassing apparatus 20 is with advantage at least partly located inside the second oil accumulation chamber 4 with the first exit 22a and the second entrance 21b of the apparatus located inside the second oil accumulation chamber and with the second exit 22b and the first entrance 21a of the apparatus located on the outside of the second oil accumulation chamber, as illustrated in FIG. 3. In the illustrated example, the outer casing 27 of the degassing apparatus 20 extends into the second oil accumulation chamber 4 through an opening 9 provided in an upper outer wall 10 of the second oil accumulation chamber 4. The casing 27 is sealingly secured to this wall 10 so as to prevent air from penetrating into the second oil accumulation chamber 4 via the opening 9. The degassing apparatus 20 may alternatively be located on the outside of the reservoir 2 with the first exit 22a and the second entrance 21b of the apparatus connected to the reservoir 2 via a respective fluid conduit. In the latter case, the casing 27 of the degassing apparatus may be secured to an outer wall of the reservoir 2.

The oil in the first oil accumulation chamber 3 is separated from the surrounding air. This separation is achieved by means of an air-tight flexible member 11 in the form of a membrane or bag arranged in the first oil accumulation chamber 3 in such a manner that a first side of the flexible member 11 is in contact with the surrounding air, whereas the other side thereof is in contact with the oil in the first oil accumulation chamber 3, as illustrated in FIG. 3. Thus, the flexible member 11 keeps the oil in the first oil accumulation chamber 3 separated from direct contact with surrounding air and the oil in the first oil accumulation chamber 3 is subjected to atmospheric pressure via this flexible member 11.

In the example illustrated in FIGS. 2 and 3, the first oil accumulation chamber 3 is provided with a flexible member 11 in the form of a membrane bag, preferably made of a thin plastic foil with high elasticity. The membrane bag 11 is dimensioned to essentially fill the entire space of the first oil accumulation chamber 3 when assuming its fully expanded state. In the illustrated example, the membrane bag 11 is provided with an upper flange 12 that is sealingly clamped, for instance by means of bolting, between a mounting surface 13 of the reservoir 2 and a lid 14 covering an upper opening 15 into the first oil accumulation chamber 3. Surrounding air is thereby prevented from penetrating into the oil accumulation space between the membrane bag 11 and the bottom of the first oil accumulation chamber 3. A sealing member, for instance in the form of an O-ring or the similar, may be arranged between the mounting surface 13 and the flange 12 of the membrane bag 11 in order to secure an air-tight connection between the mounting surface and the membrane bag. The space between the membrane bag 11 and the lid 14 is connected to the surrounding atmosphere via an aperture provided in the lid 14, a fluid conduit 16 and an air filter 8. A flow passage 17 is provided between the upper part of the first oil accumulation chamber 3 and the upper part of the second oil accumulation chamber 4 so as to allow gases to flow into the second oil accumulation chamber 4 from the space in the first oil accumulation chamber 3 between the oil surface and the membrane bag 11.

In the example illustrated in FIGS. 2 and 3, the unit 1 comprises a fluid conduit 90 having a lower end 91 connected to the lower part of the first oil accumulation chamber 3 and an upper end 92 connected to the surroundings and located at a level above the first oil accumulation chamber. Said upper end 92 of the fluid conduit is with advantage connected to the surroundings via the air filter 8, as illustrated in FIG. 3. This fluid conduit 90 will function as a lever control by allowing oil to escape into the surroundings from the first oil accumulation chamber 3 if the reservoir 2 is completely filled with oil. The fluid conduit 90 will also function as a pressure limiter by allowing air to flow into the reservoir 2 if the oil surface in the reservoir sinks to a level below the connection 93 between the fluid conduit 90 and the first oil accumulation chamber 3 and by allowing oil to escape into the surroundings if the pressure inside the reservoir 2 becomes too high. The fluid conduit 90 may with advantage comprise a transparent gauge pipe 18 for indicating the level of the oil surface in the first oil accumulation chamber 3.

When the unit 1 according to FIGS. 2 and 3 has been assembled and installed in an oil system, oil is pumped into the system by means of an auxiliary oil pump only used for filling oil into the system. As the oil level rises in the reservoir 2, air is allowed to escape from the reservoir into the surroundings via an aperture 19 provided at the upper part of the second oil accumulation chamber 4. Oil is pumped into the system until a desired maximum volume of oil has been supplied into the reservoir 2 and the bottom of the membrane bag 11 has been pressed upwards towards the lid 14. The filling of oil into the system is then stopped and the aperture 19 is plugged in an air-tight manner so as to prevent any further flow of air through this aperture. The ordinary oil pumps of the oil system may now be switched on so as to start operating, which implies that oil is made to circulate in a circuit out of the second oil accumulation chamber 4 via one of the ports 6 and back into the second oil accumulation chamber 4 via the degassing apparatus 20. At the beginning, air will be conveyed into the reservoir 2 by the oil returned to it. This air will be separated from the oil and accumulate at the upper part of the second oil accumulation chamber 4 in direct contact with the second entrance 21b of the degassing apparatus 20. The degassing apparatus 20 will start operating by the action of the pressurized oil supplied into the apparatus via the first entrance 21a thereof, which implies that an under-pressure is generated in the room 30. This under-pressure will cause degassing of the oil received in the room 30 and will also suck air into the room 30 from the upper part of the second oil accumulation chamber 4 via the second entrance 21b. In a short time, the free air in the upper parts of the reservoir 2 has been removed by the degassing apparatus 20 and the membrane bag 11 has been expanded so as to assume a position resembling the position illustrated in FIG. 3. The membrane bag 11 is now filled with air of atmospheric pressure, whereas the remaining space inside the reservoir 2 is filled with oil. There will be pressure balance at the bottom of the membrane bag 11. The static pressure of the oil at the bottom of the membrane bag 11 will therefore always be equal to the atmospheric pressure, which implies that the oil level in the first oil accumulation chamber 3 can be read on the gauge pipe 18. There is an under-pressure above the oil surface in the first oil accumulation chamber 3 in the space between the oil surface and the membrane bag 11, and the membrane bag 11 is therefore subjected to a small internal overpressure which causes the membrane bag 11 to expand into abutment against the lateral walls of the first oil accumulation chamber 3.

Two alternative variants of a degassing apparatus 20 that may form part of a unit 1 according to the invention will now be described in closer detail with reference to FIGS. 4a-4c and FIG. 5. As mentioned above, the respective apparatus 20 comprises a room 30 with an inlet 31 and an outlet 32 and a non-return valve 33 connected to the upper part of the room. The above-mentioned suction arrangement 40 of the apparatus 20 is arranged in a channel 23 having an inlet end 23a connected to the first entrance 21a of the apparatus and an outlet end 23b connected to the first exit 22a of the apparatus. This suction arrangement 40 consists of a suction pump of ejector type, which comprises a nozzle 41, a suction part 43 and a diffusor part 42. The outlet 32 of the room 30 is directly connected to the suction part 43 so as to allow the suction pump to suck out oil from the room 30 via the outlet 32 and the suction part 43.

Figure 4A:
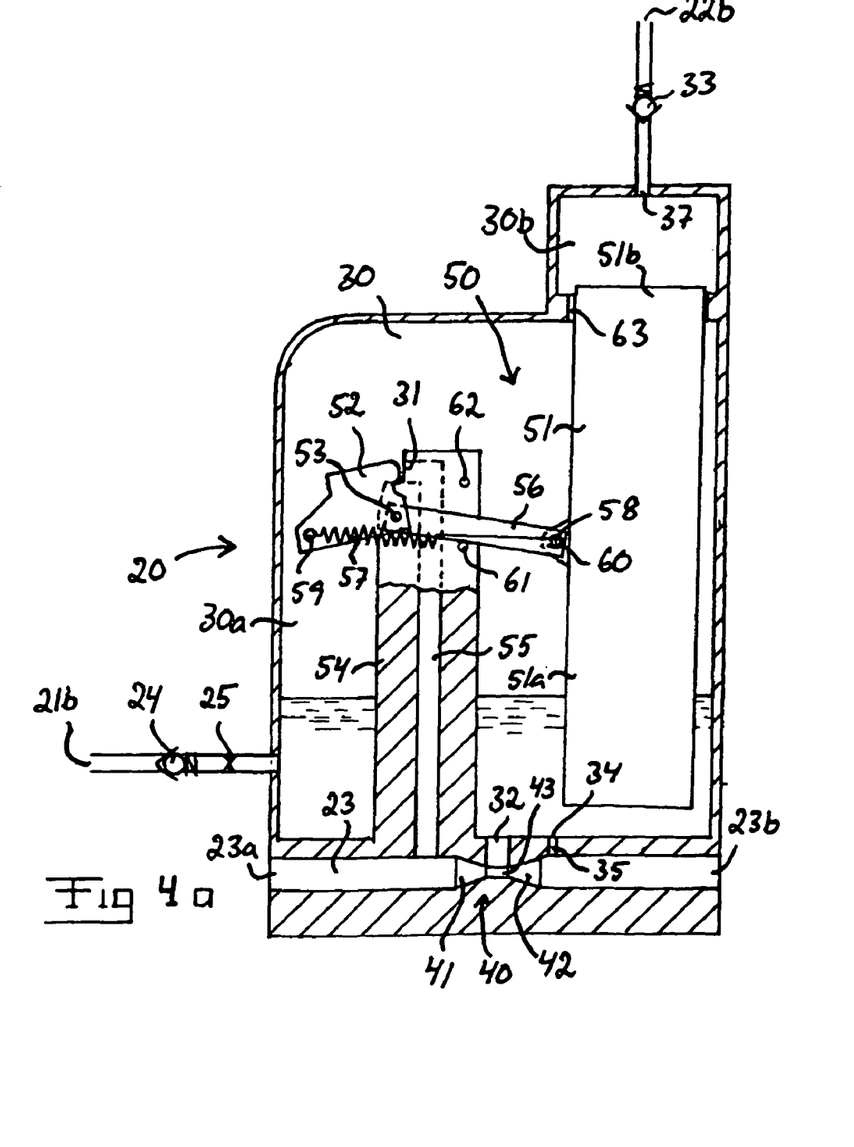
FIGS. 4a-4c are schematic, cut lateral views of a degassing apparatus of a first variant for use in a unit of the present invention, illustrating different stages of the operating cycle of the apparatus.
Figures 4B, 4C, 5:
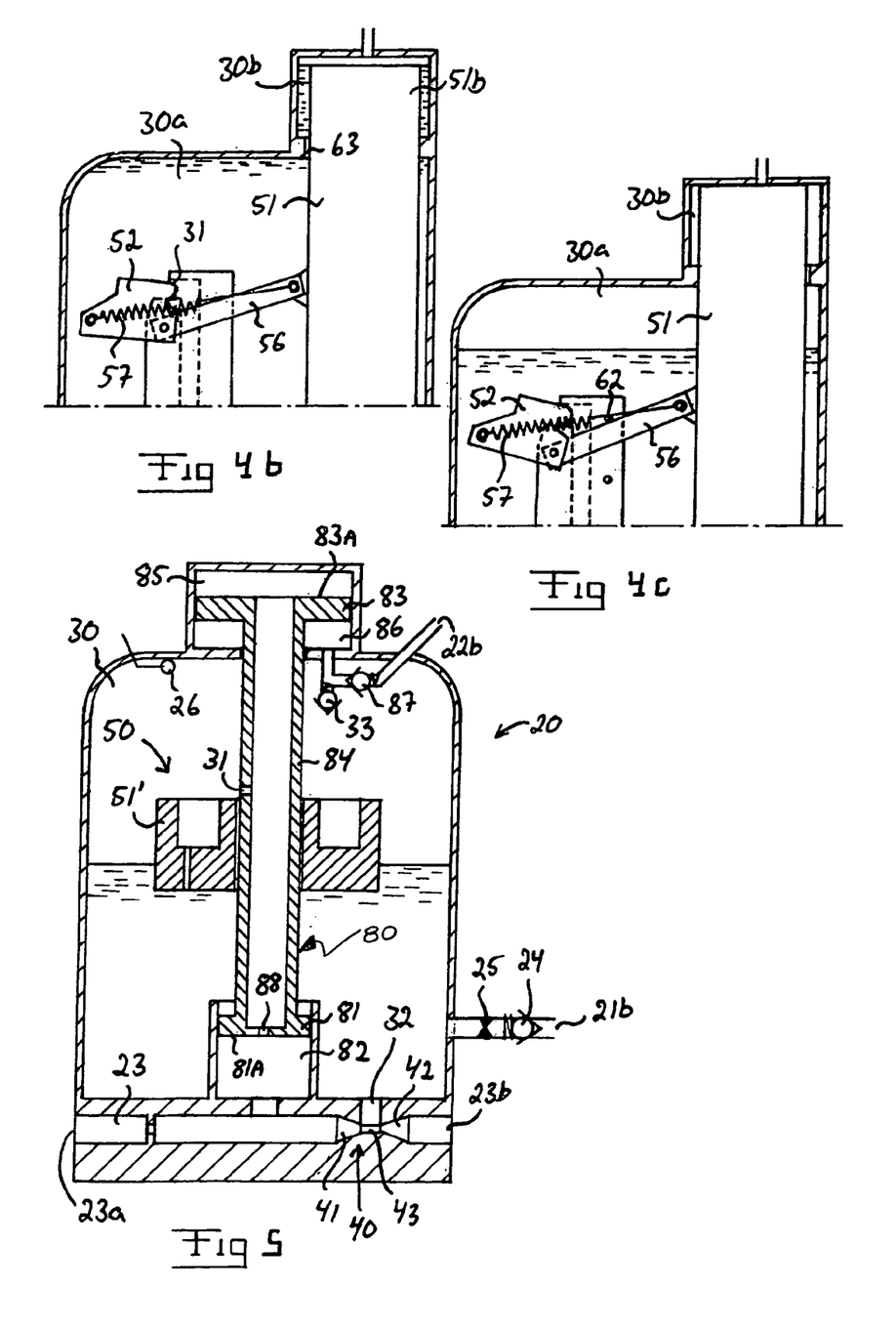
FIG. 5 is a schematic, cut lateral view of a degassing apparatus of a second variant for use in a unit of the present invention.

In the variant illustrated in FIGS. 4a-4c, the degassing room 30 comprises a first chamber 30a and a second chamber 30b connected to the first chamber. The second chamber is smaller than the first chamber and arranged above the first chamber. The inlet 31 and the outlet 32 are arranged in the first chamber 30a and the non-return valve 33 is connected to the second chamber 30b. The apparatus illustrated in FIGS. 4a-4c further comprises a regulating device 50 for regulating the feeding of oil into the room 30 via the inlet 31. The regulating device 50 is arranged to cause the feeding of oil into the first chamber 30a via the inlet 31 to be interrupted only after the first chamber 30a has been completely filled with oil and cause the feeding of oil into the first chamber 30a via the inlet 31 to start when the oil thereafter, by discharge through the outlet 32, has sunk in the first chamber 30a to a certain lower level. Gases in the space above the oil surface are pressed out via the non-return valve 33 when oil is fed into the room 30 through the inlet 31. The desired under-pressure for achieving separation of gas from the oil is created in the room 30 when the oil in the room sinks to said lower level, i.e. by means of no more than the variation of the oil level in the room 30. The efficiency of the apparatus 20 can be increased by supplying a smaller oil flow to the room 30 via a further inlet 34, which is connected to the diffusor part 42 via a non-viscous throttling 35 in a point where the static pressure is higher than in the suction part 43.

The regulating device 50 of the degassing apparatus 20 illustrated in FIGS. 4a-4c comprises a float 51 extending between the first chamber 30a and the second chamber 30b, which float is in contact with the oil in the room 30. The position of the float 51 is affected by the oil level in the room 30. The float 51 has a lower section 51a located in the first chamber 30a and an upper section 51b extending into the second chamber 30b. The regulating device 50 further comprises a valve member 52 actuated by the float 51, which valve member is arranged to open the inlet 31 when the float 51 assumes a certain lower position in the room, see FIG. 4a, and close the inlet 31 when the float assumes a certain upper position in the room, see FIG. 4c. The valve member 52 is via a joint 53 pivotably mounted to a holder 54, which extends into the first chamber 30a. The inlet 31 is arranged in this holder 54 and is connected to the channel 23 via a connecting channel 55 extending inside the holder 54. The regulating device 50 further comprises a rocker arm 56 and a tension spring 57. The rocker arm 56 is at one of its ends pivotably mounted to the float 51 via a first joint 58 and at its opposite second end pivotably mounted to the holder 54 via a second joint, which may coincide with the joint 53 of the valve member, as illustrated in FIG. 4a, or may be separated from this. By means of a first spring attachment 59 on the valve member arranged at a distance from the joint 53 of the valve member and a second spring attachment 60 on the rocker arm at its end facing the float, the tension spring 57 is mounted so as to extend between the valve member 52 and the rocker arm 56. In the illustrated example, the last-mentioned spring attachment 60 coincides with the joint 58. An upper stop member 62 is arranged on the holder 54 in order to limit the rotary movement of the rocker arm in the direction upwards and a lower stop member 61 is arranged on the holder 54 under the upper stop member in order to limit the rotary movement of the rocker arm in the direction downwards.

The rocker arm 56, the tension spring 57 and the valve member 52 are arranged to co-operate in such a manner that the tension spring retains the valve member:
  in a first rotary position, in which the valve member 52 keeps the inlet 31 open, from the moment when the float 51 assumes said lower position and until the float thereafter re-assumes said upper position, and
  in a second rotary position, in which the valve member 52 keeps the inlet 31 closed, from the moment when the float 51 assumes said upper position and until the float thereafter re-assumes said lower position.

The float 51 can be arranged to assume its upper position in two alternative ways. A first alternative is characterized in that the maximum turning moment on the rocker arm 56 caused by the buoyancy force on the float 51 is larger than the sum of the oppositely directed turning moments on the rocker arm 56 from dead weight and spring force at the lower position of the float. In this case, the float 51 is suitably arranged to leave its lower position when the oil level in the room 30 has risen so high that oil has had time to rise up into the ring gap 63 defined by the float between the first chamber 30a and the second chamber 30b. In this case, the ring gap 63 is large and will obstruct neither a flow of gas nor a flow of oil to pass. The second alternative is characterized in that the maximum turning moment on the rocker arm caused by the buoyancy force on the float 51 is smaller than the sum of the oppositely directed turning moments on the rocker arm 56 from dead weight and spring force at the lower position of the float. In this case, the ring gap 63 is formed with a smaller play which will not obstruct a gas flow from passing but which will create a higher pressure in the first chamber 30a than in the second chamber 30b when a corresponding oil flow passes the ring gap. The upwardly directed forces on the float will hereby obtain a required contribution when an oil flow is passing the gap 63, which will make the float leave its lower position and move towards its upper turning position.

A degassing apparatus of the type illustrated in FIGS. 4a-4c, the operation thereof and alternative embodiments thereof are described in closer detail in the co-pending PCT-application No. PCT/SE2007/050909, the entire contents of which are incorporated herein by reference.

In the variant illustrated in FIG. 5, the degassing apparatus 20 comprises a vacuum pump 80 comprising a piston device which is hydraulically operated by the oil that is to be degassed. The piston device comprises a lower piston 81, which is affected with a force upwards by the pressure in a lower chamber 82 of a lower cylinder, and an upper piston 83, which is connected to the lower piston via a tubular piston rod 84 and which is affected with a force downwards by the pressure in an upper chamber 85 of an upper cylinder. The upper cylinder comprises a further chamber 86 which sucks gas from the degassing room 30 via the non-return valve 33 when the upper piston 83 is displaced upwards in the upper cylinder. When the upper piston 83 thereafter is displaced downwards in the upper cylinder, the gas located in the chamber 86 is then pressed out to the atmosphere via a further non-return valve 87 arranged between the chamber 86 and the second exit 22b of the apparatus. The displacement motions of the piston device 81, 83, 84 are controlled in dependence on the oil level in the room 30. The chamber 82 of the lower cylinder is connected to the relatively constant oil flow that is flowing into the apparatus 20 via the first entrance 21a thereof. The chamber 82 is hydraulically connected to the chamber 85 via a non-viscous throttling 88 in the piston rod 84. The chamber 82 is also connected to the suction arrangement 40, which conducts the oil to the first exit 22a of the apparatus. The inlet 31 to the room 30 is arranged in the piston rod 84 and is closable by means of a float 51' slideably mounted in relation to the piston rod. When the oil level in the room 30 is low, the float 51' is located in a lower position so that the inlet 31 is uncovered and oil is allowed to flow into the room 30 via this inlet. The pressure in the upper chamber 85 will then become low and the piston device 81, 83, 84 is made to assume its upper position owing to the fact that inflowing oil creates a higher pressure in the lower chamber 82 by the pressure difference at the passage of the oil through the throttling 88. When the upper piston 83 is displaced upwards in the upper cylinder, a vacuum is created in the chamber 86, which results in that gas is sucked into the chamber 86 from the room 30 via the non-return valve 33. Hereby, an under-pressure that promotes separation of gas and water from the oil is generated in the room 30. When the oil fed into the room via the inlet 31 has risen to a certain level in the room 30, the float 51' will close the inlet 31 by a displacement upwards in relation to the piston rod 84, whereupon the feeding of oil into the room 30 is interrupted at the same time as the pressures in the chambers 82 and 85 are equalized owing to the fact that the oil flow through the throttling 88 ceases. Since the piston area 83A of the upper piston is several times larger than the piston area 81A of the lower piston, the piston device will now be displaced downwards. The closing of the inlet 31 also results in that the pressure is increased upstreams of the throttling 88, since the entire oil flow entering through the first entrance 21a of the apparatus will now pass through the suction arrangement 40, whereby the suction capacity of the suction arrangement is increased and oil is sucked out from the room 30 via the outlet 32. When the oil thereafter has sunk to a certain level in the room 30, the float 51' will again uncover the inlet 31, whereupon the piston device 81, 83, 84 will be displaced upwards while sucking out gas and water vapour from the room. Due to the under-pressure in the room 30, the oil will get supersaturated with gas when entering the room, which results in that gas bubbles are formed in the oil, which gas bubbles will rise to the oil surface and accumulate in the space above the oil surface in the room 30. Moisture in the form of water vapour will be brought along with the gas bubbles, which results in that degassing and dewatering of the oil always will take place simultaneously. Gas and water vapour released from the oil are then emitted to the atmosphere via the non-return valve 33, the chamber 86 and the non-return valve 87. The above-described operating cycle of the degassing apparatus 20 is then repeated continuously for a continuous degassing and dewatering of the oil in the oil system connected to the unit 1.

A degassing apparatus of the type illustrated in FIG. 5, the operation thereof and alternative embodiments thereof are described in closer detail in WO 94/28316 A1, the entire contents of which are incorporated herein by reference.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A unit for accumulating and degassing oil in an oil system, the unit (1) comprising a reservoir (2) for accumulation of oil provided with one or several inlet and outlet ports (6), through which oil is allowed to flow into and out of the reservoir (2), characterized in:

that the reservoir (2) comprises a first oil accumulation chamber (3) in which the oil is subjected to atmospheric pressure and in which the oil volume is allowed to vary, a second oil accumulation chamber (4) which is intended to be completely or at least nearly completely filled with oil and in which the oil is kept separated from direct contact with surrounding air, and a flow passage (7) between the second oil accumulation chamber (4) and the lower part of the first oil accumulation chamber (3);

that an air-tight flexible member (11) in the form of a membrane or bag is arranged in the first oil accumulation chamber (3) in order to keep the oil in the first oil accumulation chamber separated from direct contact with surrounding air, the oil in the first oil accumulation chamber (3) being subjected to atmospheric pressure via this flexible member (11); and that the unit (1) comprises an apparatus (20) for degassing oil, which apparatus (20) is connected to the reservoir (2) and is provided with:

an entrance (21a) for feeding oil into the apparatus (20), a first exit (22a) connected to the reservoir (2) for feeding oil out of the apparatus (20) and into the reservoir (2), a degassing room (30) in which oil is subjected to under-pressure for promoting separation of gas from the oil, a second exit (22b) connected to the degassing room (30) for discharging separated gas from the apparatus (20), an inlet (31) connected to the entrance (21a) for feeding oil into the degassing room (30), and an outlet (32) connected to the first exit (22a) for feeding oil out of the degassing room (30).

2. A unit according to claim 1, characterized in that the upper part of the second oil accumulation chamber (4) is connected to said degassing room (30) via a non-return valve (24), through which gases and oil is allowed to be sucked into the degassing room (30) from the upper part of the second oil accumulation chamber (4).

3. A unit according to claim 2, characterized in:

that a throttling (25) is arranged between the upper part of the second oil accumulation chamber (4) and the degassing room (30) in series with said non-return valve (24); and that a pressure sensor (26) is arranged in the degassing room (30) for measuring the pressure therein.

4. A unit according to claim 1, characterized in that a flow passage (17) is provided between the upper part of the first oil accumulation chamber (3) and the upper part of the second oil accumulation chamber (4) so as to allow gases to flow into the second oil accumulation chamber (4) from the space in the first oil accumulation chamber (3) between the oil surface and the flexible member (11).

5. A unit according to claim 1, characterized in that the degassing apparatus (20) is at least partly located inside the second oil accumulation chamber (4) with the first exit (22*a*) of the apparatus located inside the second oil accumulation chamber (4).

6. A unit according to claim 5, characterized in that the degassing apparatus (20) is secured to an outer wall (10) of the second oil accumulation chamber (4) and extends into the second oil accumulation chamber (4) through an opening (9) in this wall (10).

7. A unit according to claim 1, characterized in that the degassing apparatus (20) is hydraulically driven by the oil fed into the apparatus via the entrance (21*a*) thereof.

8. A unit according to claim 1, characterized in that said first exit (22*a*) of the degassing apparatus (20) is connected to the second oil accumulation chamber (4) for feeding oil out of the apparatus (20) and into the second oil accumulation chamber.

* * * * *

UNITED STATES PATENT AND TRADEMARK OFFICE
CERTIFICATE OF CORRECTION

PATENT NO. : 8,118,921 B2
APPLICATION NO. : 12/450375
DATED : February 21, 2012
INVENTOR(S) : Ingvast et al.

It is certified that error appears in the above-identified patent and that said Letters Patent is hereby corrected as shown below:

On the title page, Item (73):

"(73) Assignee: Hydac Fluisteknik AB" should read

--(73) Assignee: Hydac Fluidteknik AB--.

Signed and Sealed this
Third Day of April, 2012

David J. Kappos
*Director of the United States Patent and Trademark Office*